United States Patent
Lastinger et al.

(10) Patent No.: US 7,349,701 B2
(45) Date of Patent: Mar. 25, 2008

(54) METHOD AND APPARATUS FOR CREATING SHAPE ANTENNA RADIATION PATTERNS

(75) Inventors: Roc Lastinger, Cave Creek, AZ (US); John Spenik, Phoenix, AZ (US); Brian C Woodbury, Gilbert, AZ (US); Nicholas Funke, Scottsdale, AZ (US)

(73) Assignee: Rotani, Inc., Scottsdale, AZ (US)

( * ) Notice: Subject to any disclaimer, the term of this patent is extended or adjusted under 35 U.S.C. 154(b) by 342 days.

(21) Appl. No.: 11/160,937

(22) Filed: Jul. 15, 2005

(65) Prior Publication Data

US 2005/0277441 A1 Dec. 15, 2005

Related U.S. Application Data

(63) Continuation-in-part of application No. 10/880,387, filed on Jun. 29, 2004, and a continuation-in-part of application No. 10/869,201, filed on Jun. 15, 2004.

(60) Provisional application No. 60/589,088, filed on Jul. 19, 2004.

(51) Int. Cl.
*H04Q 7/20* (2006.01)
(52) U.S. Cl. ............... 455/446; 455/63.4; 455/562.1
(58) Field of Classification Search ............... 455/25, 455/446, 447, 562.1, 63.4; 343/767, 770
See application file for complete search history.

(56) References Cited

U.S. PATENT DOCUMENTS

| | | | |
|---|---|---|---|
| 3,317,912 A | 7/1963 | Kelleher | |
| 4,825,222 A | 4/1989 | Butcher | |
| 5,771,449 A | 6/1998 | Blasing | |
| 5,818,385 A | 10/1998 | Bartholomew | |
| 5,969,689 A | 10/1999 | Martek et al. | |
| 6,070,090 A | 5/2000 | Feuerstein | |
| 6,104,935 A | 8/2000 | Smith | |
| 6,278,723 B1 | 8/2001 | Meihofer | |
| 6,304,762 B1 | 10/2001 | Myers | |
| 6,400,955 B1 | 6/2002 | Kawabata | |
| 6,405,058 B2 | 6/2002 | Bobier | |
| 6,463,301 B1 | 10/2002 | Bevan | |
| 6,470,195 B1 | 10/2002 | Meyer | |

(Continued)

FOREIGN PATENT DOCUMENTS

EP 0734194 3/1995

(Continued)

OTHER PUBLICATIONS

Kagoshima, K., "Pattern Control Antennas for Wireless Access Systems", Antennas and Propagation Society International Symposium, 2000, IEEE, vol. 2, Jul. 16, 2000, pp. 574-577.

*Primary Examiner*—Lee Nguyen
(74) *Attorney, Agent, or Firm*—Letham Law Firm LLC; Lawrence Letham

(57) ABSTRACT

Methods and apparatus for antennas, wireless cells and networks are described. Antennas use a shield to provide a shape of coverage, area of coverage, and channel assignment pattern configured for high throughput wireless cells and networks. Diplexers are used to form wireless cells configured for high throughput wireless cells and networks.

18 Claims, 7 Drawing Sheets

U.S. PATENT DOCUMENTS

| | | |
|---|---|---|
| 6,486,832 B1 | 11/2002 | Abramov |
| 6,505,045 B1 | 1/2003 | Hills |
| 6,531,985 B1 | 3/2003 | Jones |
| 6,560,443 B1 | 5/2003 | Vaisanen |
| 6,690,657 B1 | 2/2004 | Lau |
| 2001/0046866 A1 | 11/2001 | Wang |
| 2002/0019233 A1 | 2/2002 | Leung |
| 2002/0159405 A1* | 10/2002 | Garrison et al. ............ 370/328 |
| 2002/0197984 A1 | 12/2002 | Monin |
| 2003/0002442 A1 | 1/2003 | Flammer |
| 2003/0087645 A1 | 5/2003 | Kim |
| 2003/0109285 A1 | 6/2003 | Reed |
| 2003/0125089 A1 | 7/2003 | Pedersen |
| 2003/0181180 A1 | 9/2003 | Darabi |
| 2003/0201937 A1 | 10/2003 | Lee |
| 2004/0009791 A1 | 1/2004 | Hiramatsu |
| 2004/0196834 A1 | 10/2004 | Ofek |

FOREIGN PATENT DOCUMENTS

| | | |
|---|---|---|
| WO | 03/003511 | 1/2003 |

* cited by examiner

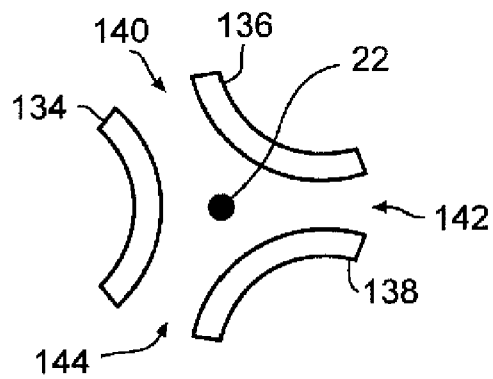
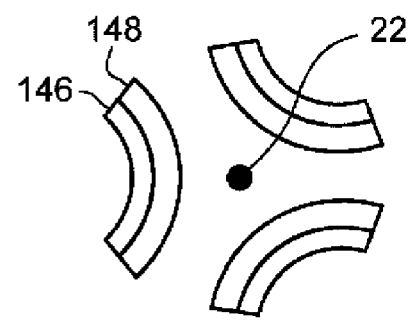
FIG. 7    FIG. 8
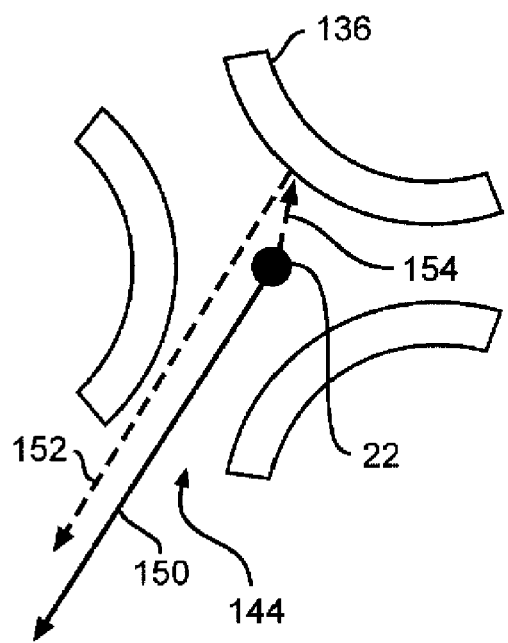
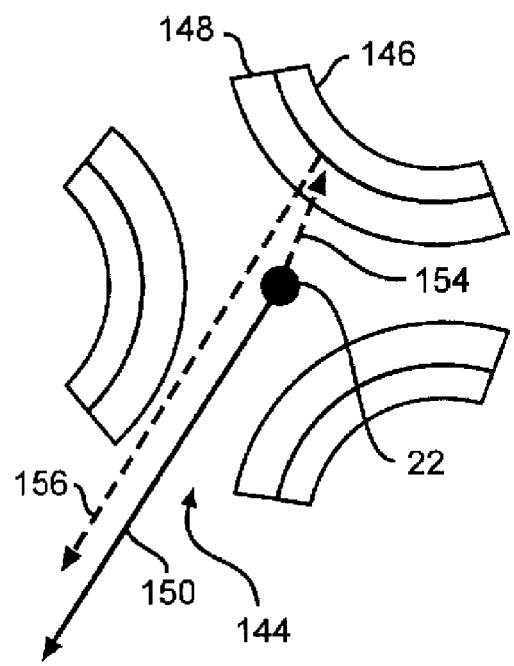
FIG. 9    FIG. 10

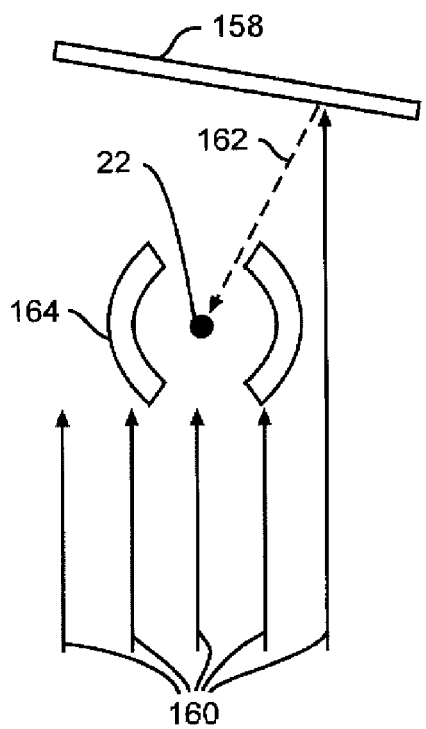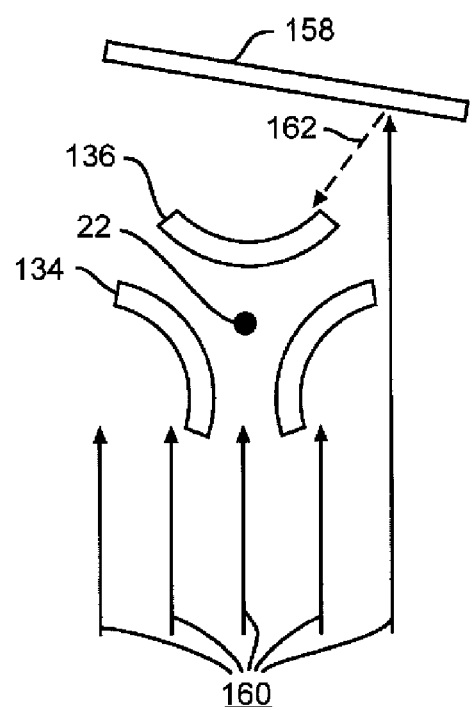
FIG. 11  FIG. 12
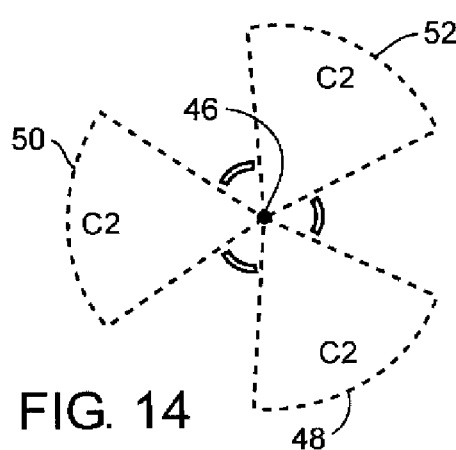
FIG. 14
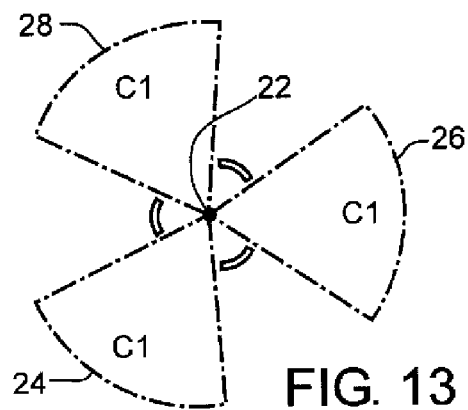
FIG. 13

METHOD AND APPARATUS FOR CREATING SHAPE ANTENNA RADIATION PATTERNS

CROSS-REFERENCE TO RELATED APPLICATIONS

This application is a continuation-in-part of and claims priority to, and the benefit of, U.S. utility application Ser. No. 10/869,201, filed on Jun. 15, 2004 and U.S. utility application Ser. No. 10/880,387, filed on Jun. 29, 2004. This application also claims priority to, and the benefit of, U.S. provisional application Ser. No. 60/589,088, filed on Jul. 19, 2004. All three applications are hereby incorporated by reference in their entirety.

FIELD OF INVENTION

This invention generally relates to wireless communications, and more particularly, to systems and methods for wireless cells, and wireless networks.

BACKGROUND OF INVENTION

Many systems incorporate the IEEE 802.11 protocols, channels, and encoding to create wireless access points and clients capable of communicating with each other regardless of the manufacturer of the device. As such, the popularity of wireless access and connectivity has increased demand for wireless throughput. However, most of the current generation of radios do not enable a developer to control the diversity switch found on most radios and many of the diversity switches do not operate in a manner that may allow radios to provide higher throughput sectorized coverage.

SUMMARY OF INVENTION

An apparatus, according to various aspects of the present invention, that facilitates wireless communication. The apparatus includes at least two omni-directional antennas and a shield. The shield has at least two openings. The antennas are positioned in the shield. A coverage lobe extends from each antenna through each of the openings. A number of coverage lobes for each antenna corresponds to a number of the openings. Coverage lobes from each antenna overlap.

An apparatus, according to various aspects of the present invention, that facilitates wireless communication. The apparatus includes a first shield and a second shield. Each shield has at least two omni-directional antennas and at least two openings. A coverage lobe extends from each antenna through each of the at least two openings of the respective first shield and second shield. The first shield is stacked and rotated relative to the second shield in such a way that at least one coverage lobe from the first shield overlaps at least one coverage lobe from the second shield, thereby forming at least one virtual lobe.

BRIEF DESCRIPTION OF THE DRAWINGS

A more complete understanding of the present invention may be derived by referring to the detailed description and claims when considered in connection with the figures, wherein like reference numbers refer to similar elements throughout the figures, and:

FIG. 7 is a diagram of a top view of an exemplary shield in accordance with an embodiment of the present invention.

FIG. 8 is a diagram of a top view of an exemplary shield configured using two materials in accordance with an embodiment of the present invention.

FIG. 9 is a diagram of a top view of an exemplary shield transmitting a signal and a reflected signal in accordance with an embodiment of the present invention.

FIG. 10 is a diagram of a top view of an exemplary shield transmitting a signal and a reflected signal through an absorptive material in accordance with an embodiment of the present invention.

FIG. 11 is a diagram of a top view of an exemplary shield receiving a signal directly and receiving a reflected signal in accordance with an embodiment of the present invention.

FIG. 12 is a diagram of a top view of an exemplary shield receiving a signal directly and blocking a reflected signal in accordance with an embodiment of the present invention.

FIG. 13 is a diagram of exemplary coverage pattern produced by an omni-directional antenna inside the exemplary shield of FIG. 2 with an exemplary channel assignment pattern in accordance with an embodiment of the present invention.

FIG. 14 is a diagram of exemplary coverage pattern produced by an omni-directional antenna inside the exemplary shield of FIG. 2 with an exemplary channel assignment pattern, but with an orientation different than the orientation of the coverage pattern of FIG. 13 in accordance with an embodiment of the present invention.

DETAILED DESCRIPTION

Figure 1:
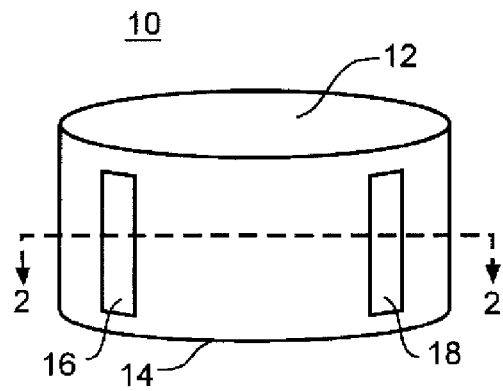
FIG. 1 is a diagram of a side view of an exemplary shield in accordance with an embodiment of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional aspects may not be described in detail herein. Furthermore, the component positions shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a customization of an existing system, an add-on product, a stand alone system, and/or a distributed system. Accordingly, the present invention may take the form of an entirely hardware embodiment, or an embodiment combining aspects of both software and hardware.

The shape of the area of coverage of an omni-directional antenna is ideally spherical. In two dimensions, the ideal shape of the area of coverage of an omni-directional antenna is typically represented as circular. A shield is used to modify the shape of coverage of an antenna, whether the antenna is directional or omni-directional. A shield selectively blocks or allows radiation from the antenna. Portions of the shield that block antenna radiation form a null in the antenna coverage area, wherein there may be reduced radio signal strength. Portions of the shield that permit antenna radiation to exit the shield form coverage lobes. The portion of the shield that permits antenna radiation is, for example, an opening in a shield. Shield openings may be of any shape, such as, for example, rectangular, circular, square, slot, and polygon. The shield openings may be of any size and may be partially and/or wholly covered with a material that is at least one of absorptive, reflective, and selectively permeable of radio waves. The dimensions of a shield opening may be related to such factors as, for example, the wavelength radiated or received by the antennas associated with the shield, the desired coverage area of a lobe, and the desired pattern formed by the lobe coverage areas. Shield opening dimensions may be whole number and/or fractional multiples of the wavelength radiated by the associated antenna. Shields may be made of any material or any combination of materials.

Figure 2:
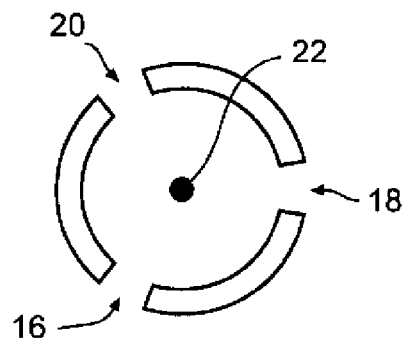
FIG. 2 is a diagram of a cross-sectional view of the exemplary shield of FIG. 1 taken along the line 2-2 in accordance with an embodiment of the present invention.
Figure 4:
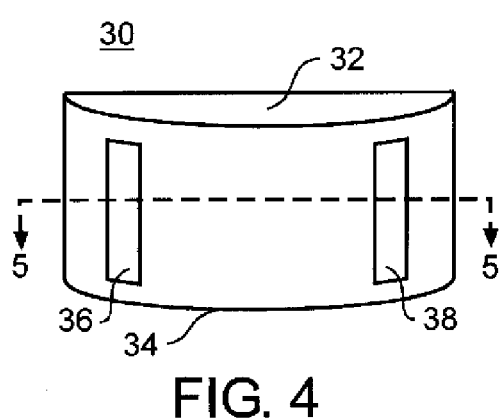
FIG. 4 is a diagram of a side view of an exemplary shield in accordance with an embodiment of the present invention.
Figure 3:
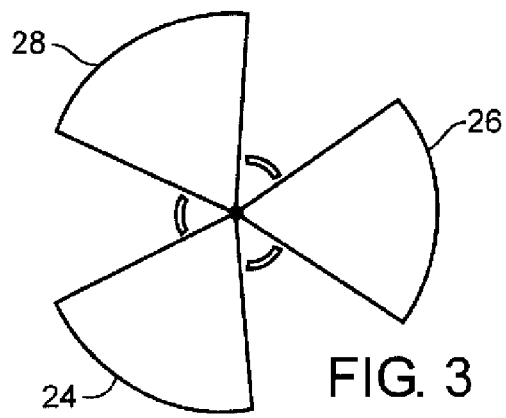
FIG. 3 is a diagram of exemplary coverage pattern produced by an omni-directional antenna inside the exemplary shield of FIG. 2 in accordance with an embodiment of the present invention.
Figure 5:
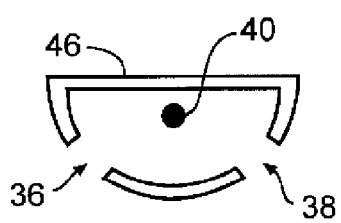
FIG. 5 is a diagram of a cross-sectional view of the exemplary shield of FIG. 4 taken along the line 5-5 in accordance with an embodiment of the present invention.
Figure 6:
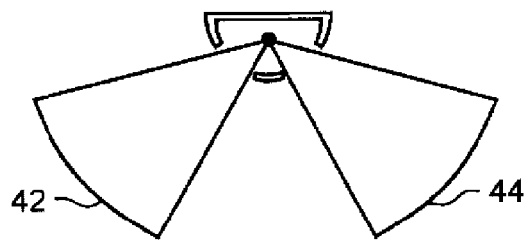
FIG. 6 is a diagram of exemplary coverage pattern produced by an omni-directional antenna inside the exemplary shield of FIG. 5 in accordance with an embodiment of the present invention.

In an exemplary embodiment, referring to FIGS. 1-3, a shield 10 is cylindrical in shape with a top 12 and a bottom 14. Omni-directional antenna 22 radiates through openings 16, 18 and 20 forming coverage lobes 24, 26, and 28, respectively. The shield between the openings in the shield may be of any length. For example, in an exemplary embodiment, the length of the shield between openings 16, 18, and 20 in the shield is about one wavelength of the wavelength associated with antenna 22. In another embodiment, the length of the shield between shield openings is about one-half a wavelength of the wavelength associated with antenna 22. Antennas may be placed at any distance from the shield suitable for a particular application and antenna. For example, an antenna is positioned with respect to the shield to provide radiation out of at least one opening. In an exemplary embodiment, referring to FIG. 2, antenna 22 is positioned from the concave portions substantially opposite of openings 16-18 to provide radiation out of each opening. In another embodiment, referring to FIGS. 4-6, a shield 30 is half of a cylinder in shape with a top 32 and a bottom 34. Omni-directional antenna 40 radiates through openings 36 and 38 forming coverage lobes 42 and 44 respectively. In another embodiment, a shield is a half-cylinder shape as shown in FIG. 5, but the openings are formed only in the straight portion 46 of the shield and not in the curved portion. A shield may have any number of openings and the openings may be distributed evenly or unevenly on the shield. The size of the opening may vary and/or be uniform in size.

In another embodiment, referring to FIG. 7, the shield comprises shield parts 134, 136, and 138 positioned with respect to omni-directional antenna 22 to form openings 140, 142, and 144. The shield of FIG. 7 may further comprise a top and/or a bottom. Radiation lobes from antenna 22 exit openings 140, 142 and 144 to form coverage lobes. The shield parts 134-138 may be of any shape or size. The shield parts of FIG. 7 are convex. In another embodiment, the shield parts are straight. Each shield part of a shield may be the same shape or of a different shape. Shield parts 134-138 may be placed in any orientation with respect to antenna 22 and with respect to each other. The shield openings resulting from the placement of shield parts 134-138 may be of any size. The shape of openings 140-142 may be of any shape.

Any number of shield parts may be used. Shield parts may be positioned to form any number of shield openings. In an exemplary embodiment, referring to FIG. 7, three shield parts 134-138 are positioned around antenna 22 to form three openings 140-144. Shields and/or shield parts may be formed of any material or combination of materials, for example, metal, wood, plastic, plastic coated with metal, foam, carbon impregnated foam, urethane, or other material suitable for the application. The materials may be at least one of absorptive, reflective, and selectively permeable of radio waves. In an exemplary embodiment, shield 10 and/or shield parts 134-138 are formed of a material configured to reflect RF signals, such as copper. In another embodiment, referring to FIG. 8, shield parts may be formed using a reflective material 146 and an absorptive material 148.

The shield, or any portion thereof, may be electrically connected to ground, any other electrical potential, or electrically floating. Any shield part may be electrically connected to any other shield part or to a top and/or a bottom. Electric potential may be static and/or dynamically adjusted according to communication parameters such as, for example, data throughput, signal to noise ratio, and interference.

The portions of a shield that block or allow radiation may be fixed or adjustable in position and/or size. Any adjustable shield portion may be manually adjustable or controlled by any force that may effectuate the adjustment, such as, for example, mechanical, electrical, sonic, pneumatic, hydraulic, and magnetic force. Changes to adjustable shield portions may be executed at any time and/or in response to communication information provided by an access point, a client, or any other devices that may be part of the wireless communication process.

The antennas used with a shield may be of any type, such as, for example, omni-directional, patch, omni-directional with reflector, omni-directional positioned in a horn, yagi, MIMO, array, adaptive array, dish, beam, and parabolic antennas. Any number of antennas may be used in conjunction with a shield. When multiple antennas are used simultaneously in a shield, there are no limitations on the type of antennas used and/or whether the antenna is omni-directional or directional. In an exemplary embodiment, referring to FIG. 2, antenna 22 is an omni-directional antenna. In another embodiment, referring to FIGS. 2 and 7, antenna 22 may be replaced by three directional antennas with one antenna positioned to radiate out each opening 16-20 or 140-144 respectively. Each directional antenna may be of a different type. Shielded antennas may be configured to operate with any communication protocol, for example, at least one of IEEE 802.11, Bluetooth, ultra-wideband, IEEE 802.15, and IEEE 802.16 communication protocols.

Now turning to multipath signals. Multipath signals may decrease wireless performance and/or throughput of some communication protocols, for example, the 802.11a/b/g protocols. A multipath signal generally refers to an original radio signal and reflected versions of the original radio signal. Reducing the transmission and reception of reflected signals may improve communication data throughput. A reflective shield may produce reflected signals. Referring to FIG. 9, in one embodiment, antenna 22 transmits signals 150 and 154. Signal 150 directly exits opening 144 as an original radio signal. Signal 154 reflects from shield 136 then exits opening 144 as a reflected signal 152. Reflected signal 152 may degrade the performance of a system that receives signals 150 and 152. Absorptive material may be used to reduce the strength of reflected signals. Referring to FIG. 10, antenna 22 transmits signals 150 and 154 as described above. Signal 154 enters absorptive material 148, thereby losing some signal strength. Signal 154 reflects from shield 146, passes through the absorptive material again, and exits absorptive material 148 as signal 156. The signal strength of 156 may be less than the signal strength of signal 150 and/or signal 154 because it passed through the absorptive material twice. The system receiving signals 150 and 156 may better distinguish between the two signals because of their difference in signal strength.

Shield placement and/or shield opening configurations may also reduce the effects of receiving multipath signals. Referring to FIG. 11, two openings may be positioned substantially opposite each other in shield 164. Transmitted signal 160 approaches the shield 164 from a direction of transmission. Part of transmitted signal 160 reaches antenna 22 directly as an original signal through an opening facing the direction of transmission of signal 160. Transmitted signal 160 also reflects from object 158 as a reflected signal 162. Reflected signal 162 also enters shield 164 through the other opening in the shield, thereby reaching antenna 22 as a multipath signal. A shield that has diametrically opposed openings may admit signals reflected in the direction opposite the direction of transmission. A different shield configuration may better block reflected and/or multipath signals. Referring to FIG. 12, transmitted signal 160 enters a shield through an opening facing the direction of transmission and reaches antenna 22. Reflected signal 162 cannot reach antenna 22 because shield part 136 partially or fully blocks reflected signal 162. A shield whose openings are not diametrically opposed may block signals reflected in the direction substantially opposite the direction of transmission.

Now turning to channel assignment. An antenna in a shield may be associated with a radio and may be assigned one or more channel. A coverage lobe formed by a radiating antenna uses the channel assigned to the antenna that forms the coverage lobe. For example, in one embodiment, referring to FIG. 13, omni-directional antenna 22 may be assigned channel C1; thus, the channel associated with coverage lobes 24, 26, and 28, produced by antenna 22, may also use channel C1. In another embodiment, referring to FIG. 14, antenna 46 may be assigned channel C2; thus, the channel associated with coverage lobes 48, 50, and 52, produced by antenna 46, may also be channel C2. Placing multiple antennas in a shield may form multiple coverage lobes out of each shield opening; however, each coverage lobe uses the channel assigned to the antenna that radiates the lobe.

Figure 15:
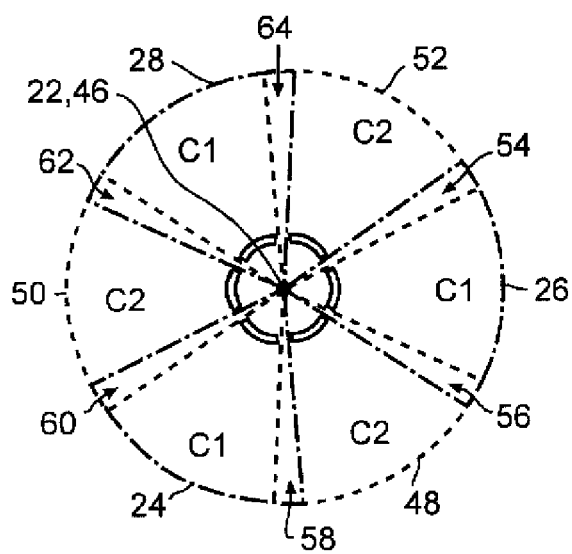
FIG. 15 is a diagram of exemplary coverage and channel assignment pattern that may result when the exemplary coverage patterns of FIG. 13 and FIG. 14 are superimposed in accordance with an embodiment of the present invention.
Figure 16:
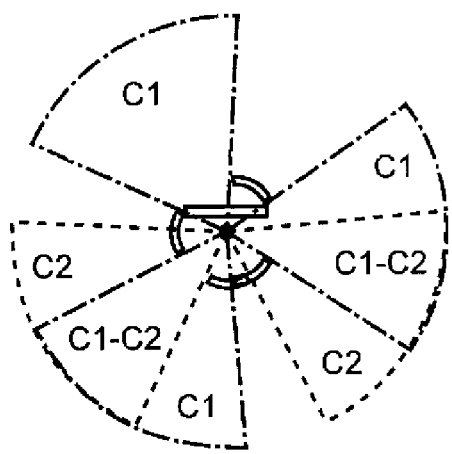
FIG. 16 is a diagram of exemplary coverage and channel assignment pattern that may result when the exemplary coverage patterns of FIG. 6 and FIG. 13 are superimposed in accordance with an embodiment of the present invention.

Now turning to stacking shields. Shields may be stacked, thereby forming a combined shape of coverage, area of coverage, and channel assignment pattern. The terms shape of coverage, area of coverage, and channel assignment pattern are fully described and established in the applications incorporated by reference above. In an exemplary embodiment, a shield having a channel assignment and coverage lobes similar to FIG. 13 may be stacked with a shield having a channel assignment, coverage lobes, and orientation similar to FIG. 14. The resulting area of coverage, shape of coverage, and channel assignment pattern may be represented by the area of coverage, shape of coverage, and channel assignment pattern shown in FIG. 15. FIG. 15, in essence, represents the superposition of the coverage patterns, areas of coverage, and channel assignment of FIGS. 13-14. When stacking shields, coverage lobes may overlap to form virtual lobes. In the embodiment shown in FIG. 15, virtual lobe 54 is formed by the overlap of coverage lobes 52 and 26, virtual lobe 56 is formed by the overlap of coverage lobes 26 and 48, and so forth. Coverage lobes may overlap by any amount. In an exemplary embodiment, each coverage lobe from a first shield, referring to FIG. 13, overlaps two adjacent lobes from a second shield, referring to FIG. 14, by about 50%. In another embodiment, referring to FIG. 16, coverage lobe 42 from FIG. 6 overlaps coverage lobe 24 from FIG. 3 by about 100%. In another embodiment, referring to FIG. 15, coverage lobes overlap by a lesser percentage. There are no limitations on the number of shields and/or associated antennas that may be stacked or the number of coverage lobes that may overlap.

Figure 17:
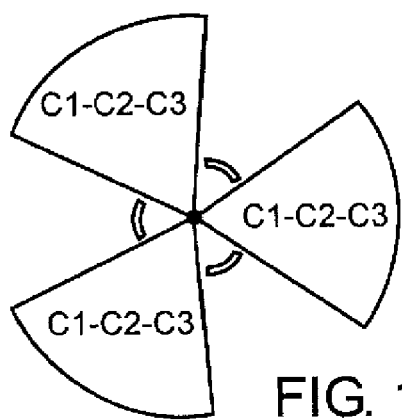
FIG. 17 is a diagram of exemplary coverage and channel assignment pattern that may result when three versions of exemplary coverage pattern of FIG. 13 are superimposed, each version using a different channel in accordance with an embodiment of the present invention.

Adjacent and/or overlapping coverage lobes may be assigned any channel. In an exemplary embodiment, adjacent and overlapping coverage lobes may use different channels. For example, referring to FIG. 15, coverage lobe 52 uses channel C2 while coverage lobe 26 uses channel C1. Virtual lobe 54 formed by the overlap of coverage lobe 52 and coverage lobe 26 is serviced using channel C1 or channel C2; thus, any wireless device and/or client positioned in virtual lobe 54 is serviced by either channel C1 or channel C2. In another embodiment, adjacent and overlapping coverage lobes may be assigned the same and/or different, minimally interfering channels. There is no limitation on the area of coverage of stacked shields. In one embodiment, a shield providing lobes of coverage similar to the lobes shown in FIG. 3 are stacked with a shield providing the lobes of coverage similar to the lobes shown in FIG. 6 to provide the coverage shown in FIG. 16. In another embodiment, three shields with their associated antennas and channel assignments overlap about 100% to form the coverage shown in FIG. 17.

Figure 18:
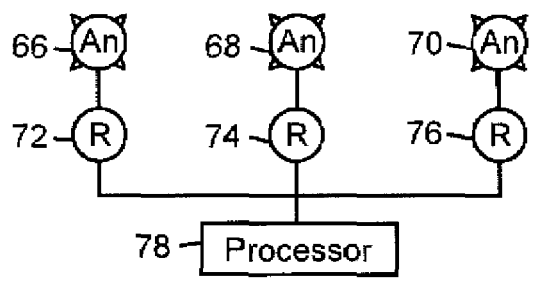
FIG. 18 is a diagram of an exemplary three shielded antenna, three radio wireless cell in accordance with an embodiment of the present invention.
Figure 19:
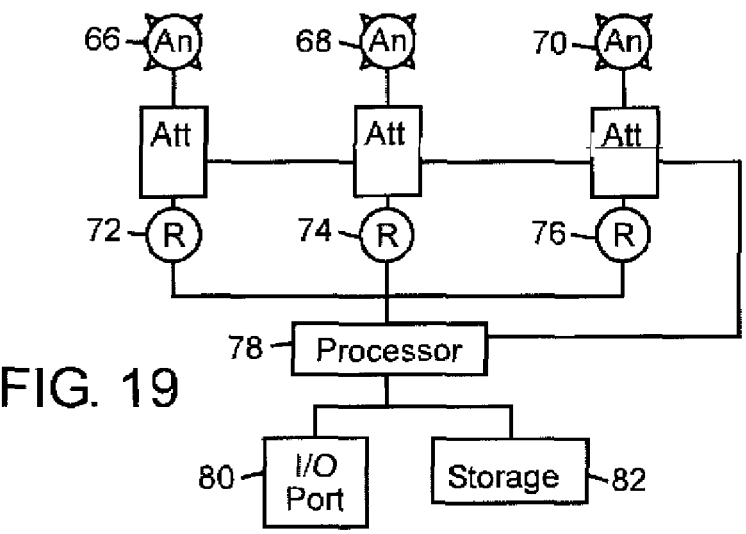
FIG. 19 is a diagram of an exemplary three shielded antenna, three attenuator, three radio wireless cell in accordance with an embodiment of the present invention.
Figure 20:
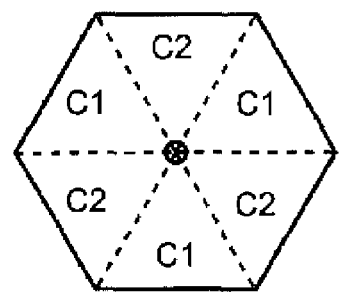
FIG. 20 is a diagram showing an approximate hexagon shape of coverage for the coverage and channel assignment pattern of FIG. 15 in accordance with an embodiment of the present invention.

Now turning to wireless cell formation using shields. Shielded antennas may be used to form wireless cells. The term wireless cell is fully described and established in the applications incorporated by reference above. In one embodiment, referring to FIG. 18, shielded antennas 66, 68, and 70 interface with radios 72, 74, and 76, respectively, and each radio interfaces with processor 78. The shields may form any shape of coverage. The shielded antennas 66, 68, and 70 are stacked to form least one of overlapping and non-overlapping coverage. Any channel assignment may be used. The channel assignments do not need to be static, but may be changed at any time. A channel change may be triggered, for example, by at least one of a fixed time interval, a random time interval, client demand, and routing demand. In one embodiment, the wireless cell circuitry of FIG. 18 forms the coverage pattern shown in FIG. 17. In another embodiment, two shielded antennas, two radios, and one processor forms a wireless cell with coverage shown in FIG. 15. In another embodiment, two shielded antennas, two radios, and one processor may form a wireless cell with coverage shown in FIG. 16. In another embodiment, referring to FIG. 19, an attenuator is placed between a radio and a shielded antenna, thereby enabling the size of the coverage lobes to be adjusted. In another embodiment, the size of a coverage lobe is adjusted by placing partially or fully absorbing and/or selectively permeable material over a shield opening. Wireless cells formed using shielded antennas may form wireless networks. The area of coverage of a stack of two shielded antennas, as shown in FIG. 15, is approximated as having a hexagon shape of coverage as shown in FIG. 20. A hexagon shaped wireless cell may be used to implement networks as taught in the applications incorporated by reference. Other channel assignments patterns may be implemented using shielded antenna stacks that may facilitate network formation. Wireless cells comprising shielded antennas are configured to operate with any communication protocol, for example, at least one of IEEE 802.11, Bluetooth, ultra-wideband, IEEE 802.15, and IEEE 802.16 communication protocols.

Figure 21:
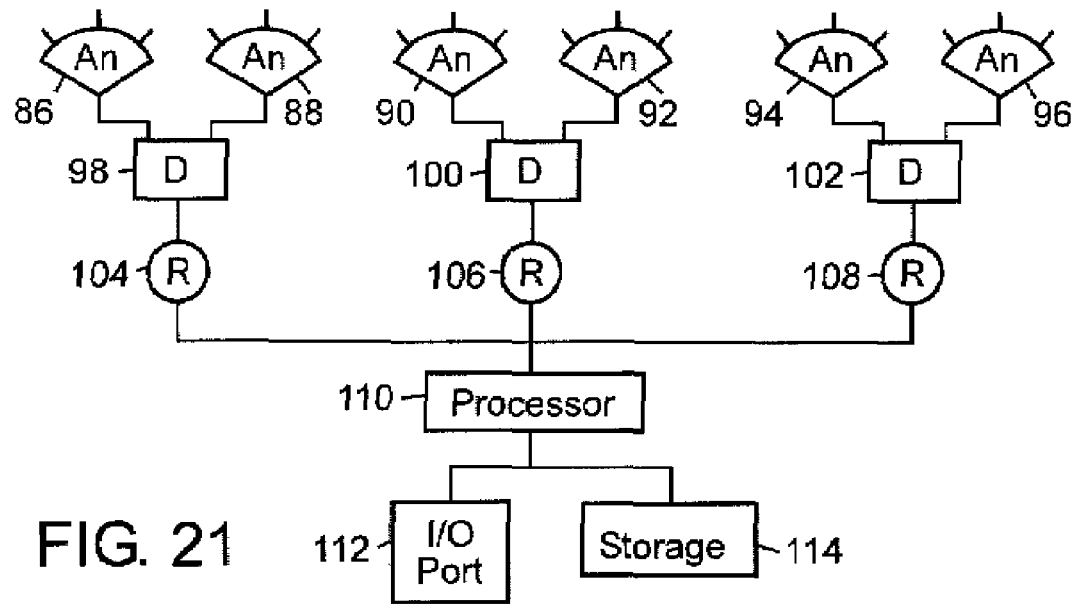
FIG. 21 is a diagram of an exemplary six antenna, three diplexer, and three radio wireless cell in accordance with an embodiment of the present invention.
Figure 22:
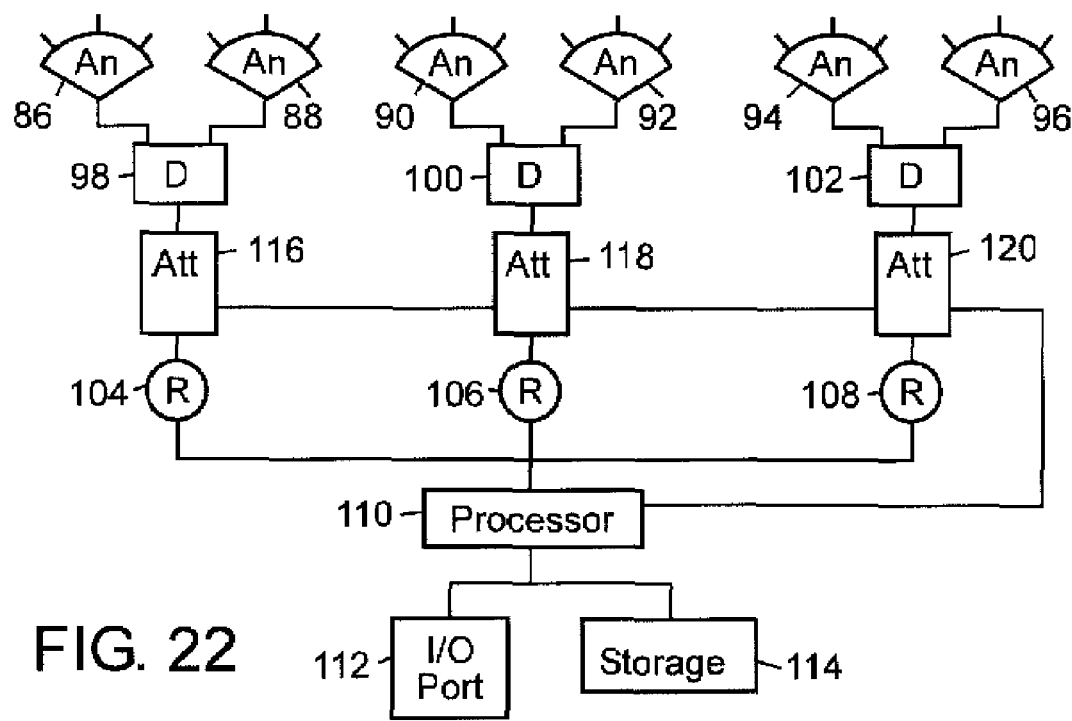
FIG. 22 is a diagram of an exemplary six antenna, three diplexer, three attenuator, and three radio wireless cell in accordance with an embodiment of the present invention.
Figure 23:
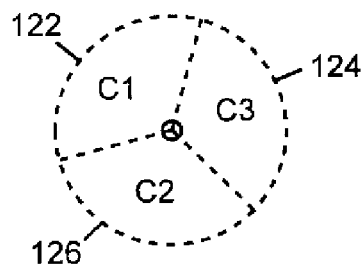
FIG. 23 is a diagram of an exemplary wireless cell formed using three, adjacent, substantially non-overlapping physical sectors providing about 360-degree coverage and having a channel assigned to each physical sector in accordance with an embodiment of the present invention.
Figure 24:
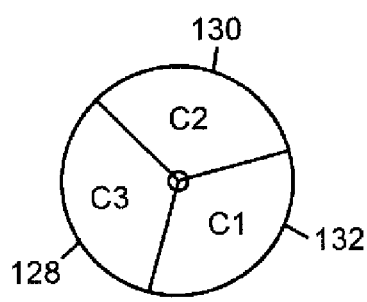
FIG. 24 is a diagram of an exemplary wireless cell formed using three, adjacent, substantially non-overlapping physical sectors providing about 360-degree coverage with an orientation different than the orientation of the wireless cell shown in FIG. 23 and having a channel assigned to each physical sector in accordance with an embodiment of the present invention.
Figure 25:
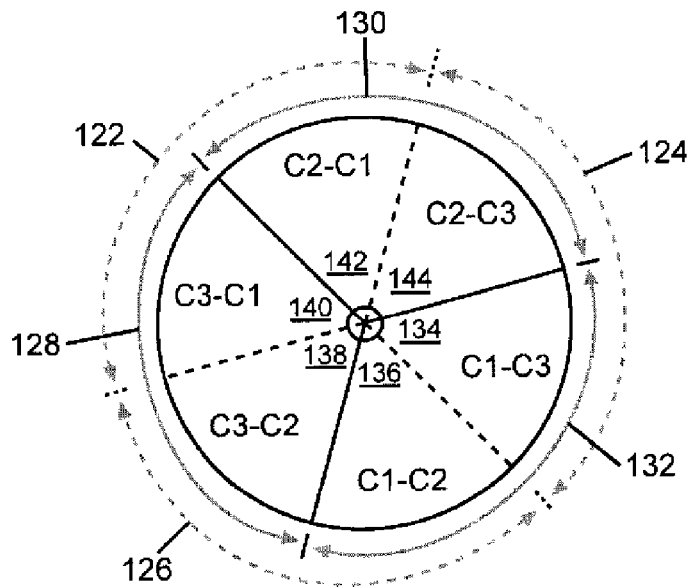
FIG. 25 is a diagram of an exemplary wireless cell formed using six overlapping physical sectors that form six virtual sectors and provides about 360-degree coverage that may result when the exemplary coverage patterns of FIG. 23 and FIG. 24 are superimposed in accordance with an embodiment of the present invention.

Now turning to wireless cells formed using diplexers. A diplexer enables at least two antennas to connect to a radio. The diplexer sums all the incoming signals from all the attached antennas and provides the combined signal to the radio. During transmission, the diplexer sends the transmit signal from the radio to all attached antennas which in turn radiate substantially the same radio signal. There is no limitation on the number of antennas that may interface with each diplexer. There are no limitations on the type of antenna that may be used with a diplexer, such as, for example, omni-directional, patch, omni-directional with reflector, omni-directional positioned in a horn, yagi, MIMO, array, adaptive array, dish, beam, and parabolic antennas. There are no limitations on the number of radios, the number of diplexers, or the number of processors that may be used to form a wireless cell. In an exemplary embodiment, as shown in FIG. 21, one processor 110 interfaces with three radios 104-108, each radio interfaces with one diplexer 98-102, and each diplexer interfaces with at least two directional antennas 86-96. The antennas are arranged to provide at least one of an overlapping and a non-overlapping coverage pattern. In one embodiment, antennas 86, 88, 90, 92, 94, and 96 are positioned such that their physical sectors 122, 132, 126, 130, 124, and 128, respectively, substantially overlap as shown in FIG. 25. For clarity, the antenna physical sectors 122-132 are separately shown in FIG. 23 and FIG. 24. The antennas 86-96 are positioned such that their physical sectors correspond to the substantially non-overlapping coverage areas of FIGS. 23-24. The superimposed coverage areas and channel assignments of FIGS. 23-24 form the overlapping wireless cell coverage area and channel assignments of FIG. 25. The antenna physical sectors 122-132 overlap to form virtual sectors 134-144. There are no limitations on the area of coverage, shape of coverage, or channel assignment patterns. A diplexer is also used with an attenuator as shown in FIG. 22. The attenuators attenuate both incoming and outgoing signals sent between the radio and the diplexer. Attenuator operation may be fixed and/or variable. There are no limitations on the number of radios, attenuators, diplexers, and antennas in a wireless cell embodiment. In one embodiment, one processor interfaces with three radios, at least one attenuator interfaces with each radio, at least one diplexer interfaces with each attenuator, and at least two directional antennas interface with each diplexer. The physical sectors of the antennas are arranged to provide at least one of overlapping and non-overlapping coverage. In an exemplary embodiment, the antennas are arranged to provide the coverage pattern of FIG. 25. Other embodiments, with other shapes of coverage, areas of coverage, angles of coverage, and channel assignment patterns as described in the applications incorporated by reference, may be implemented using wireless cells that may use diplexers. Wireless cells comprising diplexers are configured to operate with any communication protocol, for example, at least one of IEEE 802.11, Bluetooth, ultra-wideband, IEEE 802.15, and IEEE 802.16 communication protocols.

Figure 26:
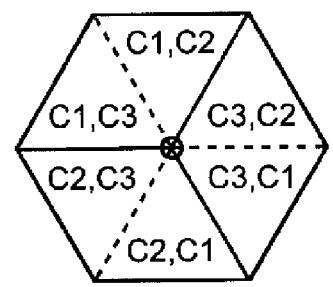
FIG. 26 is a diagram showing an approximate hexagon shape of coverage for the coverage and channel assignment pattern of FIG. 25 in accordance with an embodiment of the present invention.

Now turning to network formation using wireless cells formed using diplexers. The shape of coverage of the wireless cell of FIG. 25 is approximated to be similar to a hexagon as shown in FIG. 26. The channel assignment patterns shown in FIGS. 23-26 are achieved by assigning radio 104, 106, and 108, of FIG. 21 or 22, to channels C1, C2, and C3, respectively. Wireless networks are formed using wireless cells having a hexagonal shape of coverage as described in the applications incorporated by reference. Additionally, wireless cells using diplexers form other shapes of coverage, areas of coverage, and channel assignment patterns that are also used to form networks as described in the applications incorporated by reference.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims. Any reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. An apparatus that facilitates wireless communication, comprising:
    at least two omni-directional antennas, and;
    a shield having at least two openings, wherein:
        the antennas are positioned in the shield;
        a coverage lobe extends from each antenna through each of the at least two openings;
        a number of coverage lobes for each antenna corresponds to a number of the at least two openings; and
        the coverage lobes from each antenna overlap.

2. The apparatus of claim 1 wherein the shape of the shield is substantially at least one of cylindrical, oval, spherical, cubical, and rectangular.

3. The apparatus of claim 1 wherein the shield comprises at least two shield parts positioned to reduce a reception of a multipath signal.

4. The apparatus of claim 1 wherein the at least two openings comprise three openings.

5. The apparatus of claim 1 wherein each antenna is assigned a different channel.

6. The apparatus of claim 1 wherein the shield further comprises a top and a bottom.

7. The apparatus of claim 1 wherein the size of at least one of the openings is substantially a multiple of a frequency of operation of the antenna.

8. The apparatus of claim 1 wherein the shield comprises at least one of an RF absorptive material, an RF reflective material, and an RF selectively permeable material.

9. The apparatus of claim 1 wherein at least one of the openings is at least partially covered by at least one of an RF absorptive material, an RF reflective material, and an RF selectively permeable material.

10. The apparatus of claim 1 wherein the omni-directional antennas comprise a MIMO antenna.

11. The apparatus of claim 1 wherein at least one of the at least two antennas is adapted for at least one of a IEEE 802.11, Bluetooth, ultra-wideband, IEEE 802.15, and IEEE 802.16 communication protocol.

12. The apparatus of claim 1 further comprising:
    a processor and at least two radios, wherein:
    the radios couple to the processor; and
    each one radio couples to at least one of the at least two omni-directional antennas respectively.

13. The apparatus of claim 1 further comprising an absorptive material inside the shield to reduce a strength of a reflected signal.

14. The apparatus of claim 1 wherein the shield is electrically coupled to ground.

15. An apparatus that facilitates wireless communication, comprising:
    a first shield having at least two omni-directional antennas and at least two openings;
    a second shield having at least two omni-directional antennas and at least two openings, wherein:
        a coverage lobe extends from each antenna through each of the at least two openings of the respective first shield and second shield;
        the first shield is stacked and rotated relative to the second shield in such a way that at least one coverage lobe from the first shield overlaps at least one coverage lobe from the second shield, thereby forming at least one virtual lobe.

16. The apparatus of claim 15 further comprising:
    a processor;
    a first radio and a second radio, wherein:
        the first radio and the second radio couple to the processor;
        the first radio couples to the at least two antennas of the first shield;
        the second radio couples to the at least two antennas of the second shield.

17. The apparatus of claim 15 wherein:
    the at least two antennas of the first shield comprise a first MIMO antenna; and
    the at least two antennas of the second shield comprise a second MIMO antenna.

18. The apparatus of claim 15 wherein:
    the at least two antennas of the first shield are assigned a first channel;
    the at least two antennas of the second shield are assigned a second channel; and
    the first channel is different from the second channel.

* * * * *